C. G. LAMB AND K. O. WALDVOGEL.
SPOUT FOR CANS.
APPLICATION FILED OCT. 15, 1920.
1,437,663.
Patented Dec. 5, 1922.
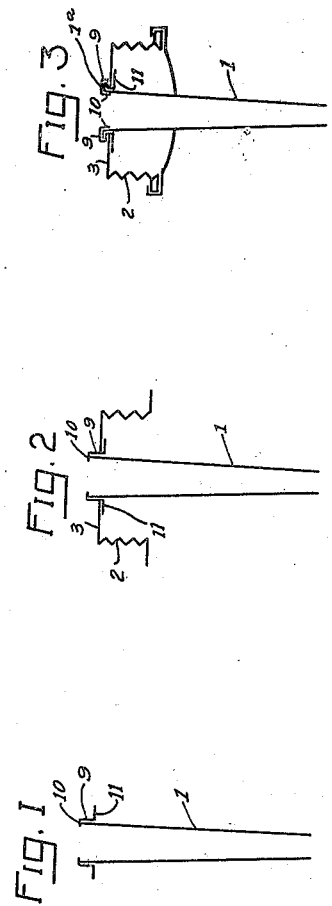
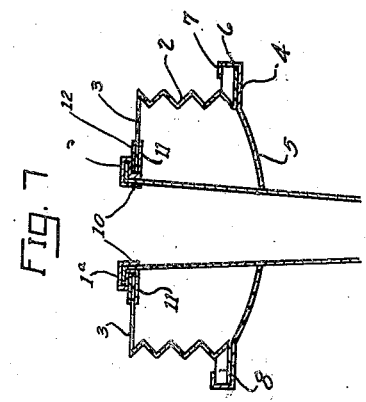
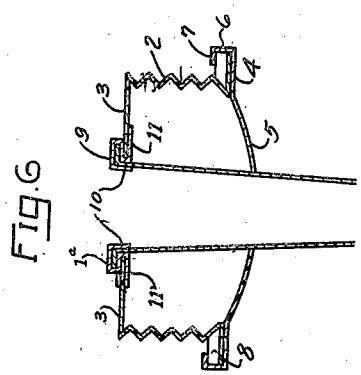
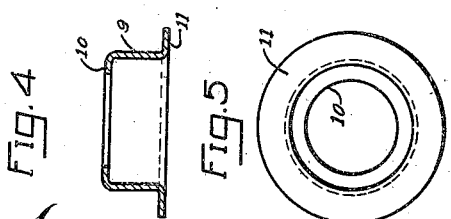

Patented Dec. 5, 1922.

1,437,663

UNITED STATES PATENT OFFICE.

CLAUDE G. LAMB AND KARL OTTO WALDVOGEL, OF URBANA, OHIO, ASSIGNORS TO THE JOHNSON MANUFACTURING COMPANY, OF URBANA, OHIO, A CORPORATION OF OHIO.

SPOUT FOR CANS.

Application filed October 15, 1920. Serial No. 417,178.

*To all whom it may concern:*

Be it known that we, CLAUDE G. LAMB and KARL OTTO WALDVOGEL, citizens of the United States, residing at Urbana, in the county of Champaign and State of Ohio, have invented certain new and useful Improvements in Spouts for Cans, of which the following is a specification.

This invention relates to improvements in spouts for cans, particularly oil cans.

An object of our invention is to provide an improved arrangement for connecting the spout proper to the threaded bushing whereby a fluid tight joint may be secured between the parts.

A further object of the invention is to provide a joint between the spout and the bushing which will be simple in construction and at the same time provide for a strong connection between the parts which will resist any unusual strains brought upon the spout.

A further object of the invention is to provide a reinforcing brace between the spout and bushing to resist lateral strains on the spout.

In the accompanying drawings:—

Fig. 1 is a diagrammatic view of a spout and ferrule in assembled condition.

Fig. 2 is a diagrammatic view of the spout, ferrule and bushing in assembled condition.

Fig. 3 is a diagrammatic view of the parts shown in Fig. 2 after clinching.

Fig. 4 is an enlarged sectional view of the ferrule.

Fig. 5 is an enlarged plan view of the same.

Fig. 6 is an enlarged sectional view of the parts.

Fig. 7 is a view similar to Fig. 6 showing the reinforcing brace for the spout.

Referring to the drawings, 1 represents the spout, which is of the ordinary tapered form in common use on oil cans. The threaded bushing which secures the spout in the threaded neck of the can is of the usual construction, having the threaded annular body portion 2, with the apertured wall 3 at one end thereof and out-turned annular flange 4 at the opposite end thereof; an apertured cap 5 having an annular rim 6 and the inturned flange 7 embracing a gasket 8, being secured to the flanged end of the bushing.

The manner of securing the bushing and the spout together is as follows:—9 represents the cylindrical body portion of a ferrule, having at one end thereof an inturned flange 10 and at the other end an out-turned flange 11. The ferrule is forced with a tight fit over the large end of the spout, as indicated in Fig. 1, with the inturned flange 10 in contact with the end of the spout. The perforated end 3 of the bushing is then laid upon the out-turned flange 11 of the ferrule. By the use of a suitable clinching machine, the parts are clinched in the manner shown in Figs. 3 and 6 in which it will be seen that the wall 9 of the ferrule will be bent outwardly, thence vertically, and then inwardly, and the flange 10 of the ferrule bent vertically, so as to firmly embrace the end of the spout, the extreme end of which has been expanded outwardly as indicated at 1ª.

By this construction it will be seen that the end wall 3 of the bushing is firmly clamped between the main wall 9 and the flange 11 of the ferrule and that the expanded end of the spout is also firmly clamped between the main wall 9 and the flange 10 of the ferrule, thus firmly securing the spout and bushing together by a joint which will be both strong and tight, obviating any leakage of the fluid. When the parts have been thus assembled the walls of the opening through the cap 5 will snugly fit the spout.

The construction described is suitable for all sizes of spouts and bushings, but in the larger sizes, I also provide between the bushing end 3 and the wall 9 of the ferrule, a reinforcing plate or washer 12, as shown in Fig. 7. Before the parts are clinched, this washer is slipped over the wall of the ferrule and laid upon the bushing end 3, so that when the parts are clinched it will be firmly held in position and will serve as a brace to resist any lateral strain which may be brought upon the spout.

Having thus described our invention we claim:—

1. The method of securing a metallic can spout to the perforated end wall of a bushing consisting in providing a ferrule with an inturned and out-turned end, placing said ferrule over the end of the spout with the inturned flange in contact therewith, laying upon the out-turned flange of the ferrule the perforated end wall of said bushing, and clinching the parts and simultaneously bending the end of the spout into an out-turned position.

2. In an article of the character described, the combination of a spout, a bushing having a perforated end wall through which the end of the spout projects, an intermediate connecting device for clamping the end wall of the bushing and the end of the spout, said intermediate connecting device having a portion thereof projected about and clamped to the inner side of the wall of the spout.

3. In an article of the character described, the combination of a spout formed with an out-turned end, a bushing having a perforated end wall through which the out-turned end of the spout projects, an intermediate connecting device for clamping the end wall and bushing and the out-turned end of the spout together, said intermediate connecting device having a portion thereof projected about and clamped to the inner side of the out-turned end of the spout.

4. In an article of the character described, the combination of a spout, a bushing having a perforated end wall through which the end of the spout projects, an intermediate ferrule having an out-turned and an inturned flange, said out-turned flange, when the parts are clinched, lying against the end wall of the bushing and said inturned flange lying against the inner side of the wall of the spout with the body of the ferrule between the two walls.

5. In an article of the character described, the combination of a spout formed with an out-turned end, a bushing having a perforated end wall through which the out-turned end of the spout projects, and an intermediate ferrule having an out-turned flange at one end an inturned flange at the other end, said out-turned flange, when the parts are clinched, embracing the end wall of the bushing adjacent the opening thereof and said inturned flange embracing the interior of the wall of the out-turned end of the spout, with the body of the ferrule between said walls.

6. In an article of the character described, the combination of a spout formed with an out-turned end, a bushing having a perforated end wall, an intermediate ferrule formed with an out-turned flange at one end and an inturned flange at the other end, said ferrule, when the parts are clinched together, having its main body portion and its inturned flange bent so as to lie between the respective walls and to extend along the inner side of the wall of the spout, with the out-turned flange clamped to the inner side of the end wall of the bushing.

7. In an article of the character described, the combination of a spout, a bushing, an intermediate device for clamping the end of the spout to the bushing, and a reinforcing washer placed between said intermediate connecting device and the wall of the bushing.

8. In an article of the character described, the combination of a spout having an out-turned end, a bushing, a ferrule arranged between the end of the spout and the bushing to clamp the same together by clinching provided with a flange projecting on one side of the wall of the bushing and a washer inserted between the ferrule and the opposite side of the wall of the bushing.

9. In an article of the character described, the combination of a spout formed with an out-turned end, a bushing, an intermediate ferrule having an out-turned flange at one end and an inturned flange at the other, the out-turned flange of said ferrule extending on the inner side of the end wall of the bushing, and a washer on the outer side of the end wall of the bushing, whereby when the parts are clinched the end wall of the bushing will be clamped between said out-turned flange and said washer by the main body of said ferrule and the end of the spout will be clamped between the main body of said ferrule and the inturned flange thereof.

In testimony whereof, we have hereunto set our hands this 8th day of October 1920.

CLAUDE G. LAMB.
KARL OTTO WALDVOGEL.

Witnesses:
JNO. R. O'BRIEN,
ISAAC T. JOHNSON.